(No Model.)

C. H. SUPPLEE.
DELIVERY WAGON.

No. 479,031. Patented July 19, 1892.

Witnesses:
Hermann Bormann
Thomas M. Smith

Inventor:
Charles H. Supplee,
by J. Walter Douglass,
Att'y.

UNITED STATES PATENT OFFICE.

CHARLES HENDERSON SUPPLEE, OF PHILADELPHIA, PENNSYLVANIA.

DELIVERY-WAGON.

SPECIFICATION forming part of Letters Patent No. 479,031, dated July 19, 1892.

Application filed March 14, 1892. Serial No. 424,760. (No model.)

*To all whom it may concern:*

Be it known that I, CHARLES HENDERSON SUPPLEE, a citizen of the United States, residing at the city of Philadelphia, in the county of Philadelphia and State of Pennsylvania, have invented certain new and useful Improvements in Delivery-Wagons, of which the following is a specification.

My invention relates to two-wheel wagons adapted to be drawn by one horse and employed for delivering milk or other goods or articles.

The principal objects of my present invention are, first, to provide a comparatively inexpensive and light-running delivery-wagon; second, to afford the driver of such a wagon free access to and from his seat on the wagon without danger of being thrown by the premature stopping or starting of the horse, and, third, to locate the driver's seat at the extreme rear of the wagon, whereby the weight of the vehicle is thrown off the horse's back in stopping and whereby the driver has the contents of the vehicle in plain sight and readily accessible to his hand.

My invention consists of a two-wheel wagon having the driver's seat located at the rear thereof and having exits and entrances located at the rear corners of the vehicle and opposite the respective ends of the seat; and my invention further consists in the improvements in wagons hereinafter described and claimed.

The nature and characteristic features of my present invention will be more fully understood from the following description, taken in connection with the accompanying drawings, forming part hereof, in which—

Figure 1:
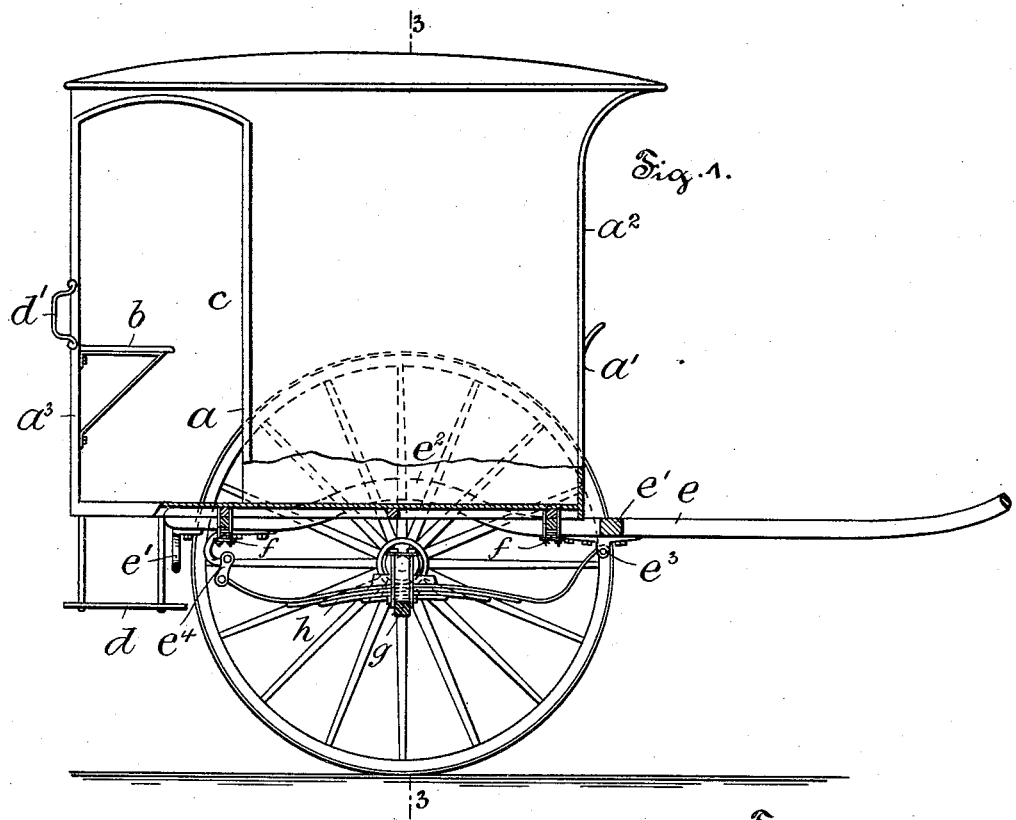
Figure 2:
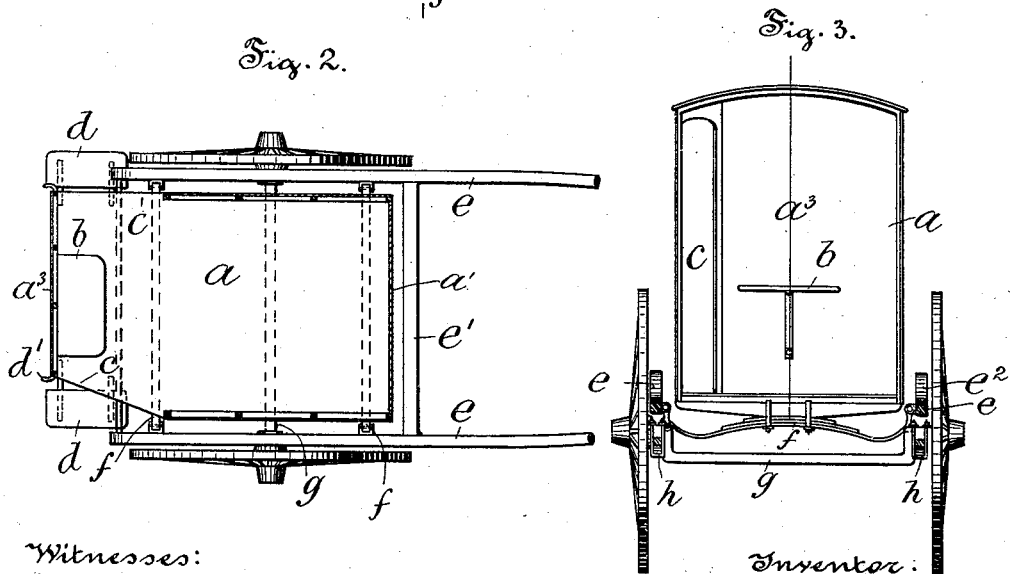
Figure 3:
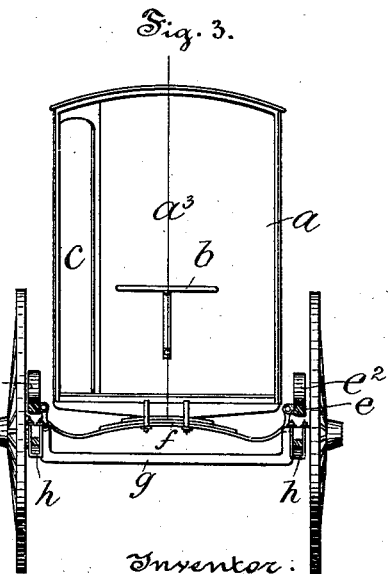

Figure 1 is a side elevation, partly in section, of a delivery-wagon embodying features of my invention. Fig. 2 is a top or plan view, partly in section, of the same; and Fig. 3 is a section on the line 3 3 of Fig. 1.

In the drawings, $a$ is the body of the wagon or vehicle. The front lower portion of this body $a$ is closed by a dasher $a'$ in such manner that an open space is provided, as at $a^2$, through which the driver may look at and ahead of the horse and through which the reins may pass.

$b$ is a seat for the accommodation of the driver. This seat is located at the extreme rear of the vehicle-body and adjacent to or in contact with the rear end wall $a^3$ thereof, for purposes hereinafter fully described.

$c$ are exits and entrances for the driver, located at the rear corners of the vehicle and opposite the respective ends of the seat $b$. These exits and entrances $c$ may be disposed diagonally across the rear corners of the body $a$, as shown at the left-hand side in Fig. 3, or in line with the side walls thereof, as shown at the right in said figure.

$d$ are steps, and $d'$ are handles, disposed conveniently for the use of the driver in mounting on and alighting from the wagon. The exits and entrances $c$ afford the driver ready means for alighting from and mounting on the vehicle, and the disposition of the seat between these entrances and exits $c$ is important, because if the horse should suddenly start, as frequently happens, while the driver is leaping into the vehicle with a parcel or can of milk in his hand the driver would be thrown into his seat $b$ or against the rear wall $a^3$ of the vehicle, whereas under similar circumstances he would be thrown to the ground if the rear wall $a^3$ of the wagon-body were provided with an entrance or exit. Moreover, the location of the seat $b$ at the rear of the vehicle causes the weight of the driver to tilt the wagon-body and its load upward and off the back of the horse in stopping, whereby the latter is protected from undue strain and burden. In this connection it is important to properly balance the body of the wagon, and this result has been attained in practice by the employment of the construction and arrangement illustrated in the accompanying drawings, in which $e$ are shafts connected by distance-pieces $e'$ and curved upward, as at $e^2$, to accommodate the hubs of the wheels. The body $a$ is connected by transversely-ranging springs $f$ to the shafts $e$. The axle $g$ is cranked downward at the center thereof to accommodate the body $a$.

$h$ are springs located adjacent to the hubs of the wheels and connected at or near the center thereof with the under side of the respective straight portions of the axle that are located on opposite sides of the cranked part thereof. The respective extremities of these springs $h$ are connected to the shafts $e$ by means of clips $e^3$ and hangers $e^4$.

Among the many advantages possessed by the hereinabove-described arrangement the following may be particularly mentioned: First, the body of the vehicle is brought very near to the ground, and, second, the wheels are brought near to the sides of the body, with the result that great strength and ease of draft are attained in a marked degree.

It will be obvious to those skilled in the art to which my invention appertains that modifications may be made in details without departing from the true spirit of my invention. For example, one of the entrances and exits may be dispensed with. Hence I do not limit myself to the exact construction hereinabove described; but,

Having thus described the nature and peculiar or characteristic features of my invention, what I claim as new, and desire to secure by Letters Patent, is—

1. A two-wheel delivery-wagon provided with a body having a driver's seat adjacent to the rear wall and entrances and exits located in the side walls opposite the ends of the seat and having a closed lower front portion adapted to contain parcels, cans, and the like and to afford a space above the same for the passage of the reins, substantially as and for the purposes set forth.

2. A two-wheel delivery-wagon provided with a body having a driver's seat, a closed rear wall forming a back for said seat, side walls having entrances and exits opposite the extremities of said seat, and a dasher at the front of the body, over which the reins pass, substantially as and for the purposes set forth.

3. A two-wheeled delivery-wagon comprising a body provided with a driver's seat located at the rear thereof and with entrances and exits opposite the ends of said seat, an axle cranked downward at the center thereof to accommodate the body, shafts connected by front and rear distance-pieces and curved upward to accommodate the axle, transversely-ranging springs connecting the front and rear of the body to said shafts, and side springs attached, respectively, to the under side of the straight portions of the axle and having their extremities connected with the shafts, substantially as and for the purposes set forth.

In testimony whereof I have hereunto set my signature in the presence of two subscribing witnesses.

CHAS. HENDERSON SUPPLEE.

Witnesses:
THOMAS M. SMITH,
RICHARD C. MAXWELL.